United States Patent [19]

Fukui et al.

[11] Patent Number: 4,839,408
[45] Date of Patent: Jun. 13, 1989

[54] STABILIZED POLYOLEFIN COMPOSITION

[75] Inventors: Yoshiharu Fukui; Kazuhisa Kuroda, both of Ichihara; Tamaki Ishii, Suita; Manji Sasaki, Ibaraki, all of Japan

[73] Assignee: Sumitomo Chemical Company, Limited, Osaka, Japan

[21] Appl. No.: 233,891

[22] Filed: Aug. 15, 1988

Related U.S. Application Data

[63] Continuation of Ser. No. 927,712, Nov. 7, 1986, abandoned.

[30] Foreign Application Priority Data

Nov. 8, 1985 [JP] Japan ................................ 60-251725
Nov. 8, 1985 [JP] Japan ................................ 60-251726

[51] Int. Cl.$^4$ ........................... C08K 5/34; C08K 5/15
[52] U.S. Cl. ................................ 524/100; 524/106; 524/108; 524/192; 524/193; 524/219; 524/302; 524/305; 524/423; 524/424; 524/430; 524/437; 524/442; 524/493
[58] Field of Search ............... 524/100, 106, 108, 192, 193, 219, 302, 305, 423, 424, 430, 437, 442, 493

[56] References Cited

U.S. PATENT DOCUMENTS

| | | | |
|---|---|---|---|
| 3,494,947 | 2/1970 | Schutze | 524/302 |
| 4,035,325 | 7/1977 | Poppe et al. | 524/106 |
| 4,576,734 | 3/1986 | Ishii et al. | 524/108 |
| 4,719,257 | 1/1988 | Ishii et al. | 524/108 |

*Primary Examiner*—John Kight
*Assistant Examiner*—Kriellion Morgan
*Attorney, Agent, or Firm*—Wenderoth, Lind & Ponack

[57] ABSTRACT

The invention relates to a stabilized polyolefin composition, which composition is stabilized against deterioration caused by contact with heavy metals and improved in coloration properties. This is achieved by blending a polyolefin with:

(A) a phenolic compound represented by the formula (I),

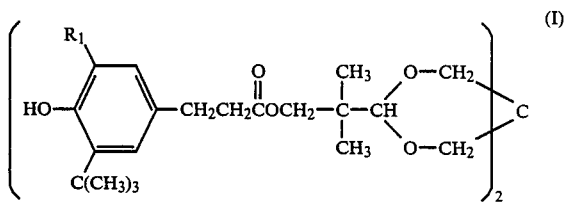

wherein $R_1$ represents a $C_1$-$C_3$ alkyl group, (B) a metal deactivator having one or more

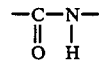

groups in the side chain, and (C) a sulfur-containing compound represented by the formula (II-1), (II-2), (II-3) or (II-4):

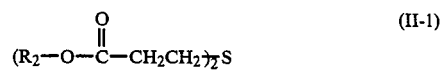

wherein $R_2$ represents a $C_4$-$C_{20}$ alkyl group,

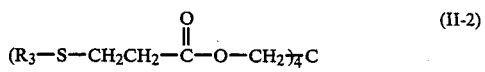

wherein $R_3$ represents a $C_4$-$C_{20}$ alkyl group,

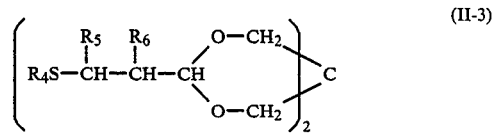

wherein $R_4$ represents a $C_3$-$C_{18}$ alkyl group, and $R_5$ and $R_6$ independently represent a hydrogen atom or a $C_1$-$C_6$ alkyl group,

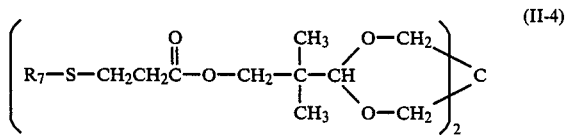

wherein $R_7$ represents a $C_3$-$C_{18}$ alkyl group.

18 Claims, No Drawings

STABILIZED POLYOLEFIN COMPOSITION

This application is a continuation of now abandoned application Ser. No. 06/927,712, filed Nov. 7, 1986, now abandoned.

The present invention relates to a stabilized composition of polyolefins, and more particularly, to a polyolefin composition particularly stabilized against deterioration caused by contact with heavy metals and improved in coloration property.

Hitherto, polyolefins such as polyethylene, polypropylene, polybutene, etc., because of their excellent mechanical and chemical properties, have been used in many fields including molding materials such as fibers, molded products, films, etc. As is well known, however, the polyolefins have a defect in stability, that is, they deteriorate in quality by the action of heat, light and oxygen at the time of processing or use, thereby showing a remarkable reduction in the mechanical properties accompanied by phenomena such as softening, embrittlement, surface crack, discoloration, etc.

It is also well known to add inorganic fillers, particularly, such as talc, calcium carbonate, etc. in order to improve the rigidity, thermal deformation, dimensional stability, etc. of shaped articles of polyolefins.

Further, it is also hitherto well known to add various kinds of phenolic, phosphite type and sulfur-containing antioxidants in the course of production and processing of synthetic resins in order to improve the stability of shaped articles of polyolefin compositions containing or not containing these inorganic fillers. For such antioxidants, a phenolic antioxidant such as for example 2,6-ditertbutyl-4-methylphenol, 2,2'-methylenebis(4-methyl-6-tert-butylphenol), 4,4'-butylidenebis(3-methyl-6-tert-butylphenol), n-octadecyl 3-(3,5-di-tert-butyl-4-hydroxyphenyl)propionate, 1,1,3-tris(2-methyl-4-hydroxy-5-tert-butylphenyl)butane, pentaerythritol tetrakis[3-(3,5-di-tert-butyl-4-hydroxyphenyl)propionate], etc. is used alone, or it is used in combination with a phosphite type antioxidant such as tris(nonylphenyl)phosphite, distearyl pentaerythritol diphosphite, etc., or with a sulfur-containing antioxidant such as dilauryl thiodipropionate, dimyristyl thiodipropionate, distearyl thiodipropionate, etc.

However, when contact of polyolefins with heavy metals such as copper, iron, nickel, etc. is not avoided, for example, in the case of the shaped articles of polyolefins used in uses wherein the polyolefins are brought into contact with heavy metals such as covering of copper wires with polyolefins, plating of polyolefins with heavy metals, coloration of polyolefins with pigments containing heavy metals, automobiles, electric appliances, etc., the polyolefins show little stability against deterioration caused by contact with heavy metals by merely using the foregoing common antioxidants.

As a method to solve such problem, it is disclosed in Japanese Patent Application Kokai (Laid-open) No. 25826/1984 that the thermal stability of polypropylene improves when an ester compound having a group represented by the formula,

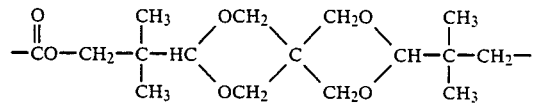

in the molecule and dilauryl thiodipropionate are added to polypropylene, and also that the thermal stability of polyethylene in contact with aluminum foil improves when the foregoing ester compound and distearyl thiodipropionate are added to polyethylene. The degree of improvement in the thermal stability is, however, still unsatisfactory in view of the level required in practical use.

On the other hand, with the object of giving to polyolefins stability against deterioration caused by heavy metals, metal deactivators such as N,N'-dibenzoylhydrazine, N-benzoyl-N'-salicyloylhydrazine, N,N'-dibutyrylhydrazine, N,N'-distearoylhydrazine, N,N'-bis[3-(3,5-di-tert-butyl-4-hydroxyphenyl)propionyl]hydrazine, N,N'-bissalicyloylhydrazine, oxalobis(benzylidenehydrazine), N-salicylidene-N'-salicyloylhydrazine, 3-(N-salicyloyl)-amino-1,2,4-triazole, etc. are generally used.

Also, it is disclosed in Japanese Patent Application Kokai (Laid-open) No. 39-141/1972 that the thermal stability of filler-containing polypropylene is improved when a metal deactivator is added to the polypropylene.

However, even when a blend of a polyolefin containing or not containing a filler with the foregoing antioxidant and metal deactivator is used in uses wherein the polyolefin is brought into contact with heavy metals, the deterioration preventing effect is still insufficient, being not said to be satisfactory. Also, when the metal deactivator is blended with the polyolefin, there occurs a problem that the polyolefin is easily colored at the time of its molding, processing or use.

Under the situation described above, an object of the present invention is to improve the above problems of polyolefins containing or not containing a filler used in uses wherein the polyolefins are brought into contact with heavy metals.

The present invention provides a polyolefin composition which comprises blending 100 parts by weight of a resin composition comprising 100 to 35 wt.% of a polyolefin and 0 to 65 wt.% of an inorganic filler with:

(A) 0.01 to 1 part by weight of phenolic compound represented by the formula (I),

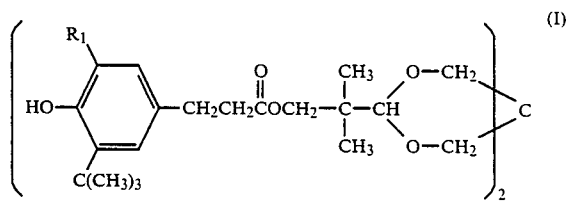

wherein $R_1$ represents a $C_1$-$C_3$ alkyl group, (B) 0.01 to 10 parts by weight of a metal deactivator which is a phenyl or phenol having one or more

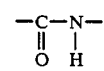

groups in the side chain, and (C) 0.01 to 1 part by weight of sulfur-containing compound represented by the formula (II-1), (II-2), (II-3) or (II-4):

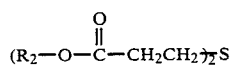
(II-1)

wherein $R_2$ represents a $C_4-C_{20}$ alkyl group,

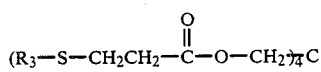
(II-2)

wherein $R_3$ represents a $C_4-C_{20}$ alkyl group,

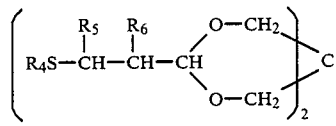
(II-3)

wherein $R_4$ represents a $C_3-C_{18}$ alkyl group, and $R_5$ and $R_6$ independently represent a hydrogen atom or a $C_1-C_6$ alkyl group,

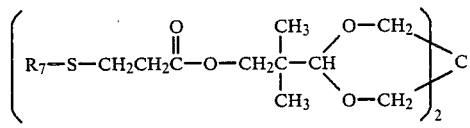
(II-4)

wherein $R_7$ represents a $C_3-C_{18}$ alkyl group.

The polyolefin used in the present invention is a homopolymer of α-olefins such as ethylene, propylene, butene-1, hexene-1, 4-methylpentene-1, etc. or a random or block copolymer comprising two or more of the α-olefins. Specifically, it includes polyethylene, polypropylene, polybutene-1, polyisobutene, poly(3-methylbutene-1), poly(4-methylpentene-1), ethylene/propylene copolymers, ethylene/butene-1 copolymers, ethylene/4-methylpentene-1 copolymers, propylene/butene-1copolymers, propylene/4-methylpentene-1 copolymers, decene-1/4-methylpentene-1 copolymers, ethylene/propylene/butene-1 copolymers, etc. When the polyolefin is a copolymer, copolymers comprising the α-olefin and, as a comonomer, a polyunsaturated compound (e.g. conjugated dienes, non-conjugated dienes), acrylic acid, methacrylic acid or vinyl acetate, are also included in the scope of the polyolefin. These polymers and copolymers may be modified with an acid, for example, they may be graft-modified with an α,β-unsaturated fatty acid, alicylic carboxylic acid or the derivative thereof, and they take various forms such as rubber-like, resinous and waxy forms.

Also, these polyolefins may be a blend.

When the inorganic filler is used in the present invention, it includes various kinds of metal oxide, metal hydroxide, metal carbonate, metal sulfate and metal silicate, silicate minerals, carbides, ceramics, etc. having an average particle diameter not more than 20μ, preferably in the range of 0.05 to 5μ. Specifically, there are given titanium dioxide, zinc oxide, aluminum hydroxide, calcium carbonate, magnesium carbonate, calcium sulfate, barium sulfate, calcium silicate, magnesium silicate, talc, micas, celite, kaolin, zeolite, silica, asbestos, glass fibers, carbon fibers, carbon black, barium titanate, lead titanate, etc. These fillers, alone or in combination, are blended with the polyolefin.

The mixing ratio of polyolefin to inorganic filler is 100-35 to 0-65 by wt.%, preferably 95-60 to 5-40 by wt.%. When the proportion of the inorganic filler exceeds 65 wt.%, a fault appears in the moldability, etc.

The phenolic compound (A) of the foregoing formula (I) used in the present invention can be produced by the common ester-interchange reaction of 3,9-bis(2-hydroxy-1,1-dimethylethyl)-2,4,8,10-tetraoxaspiro[5.-5]undecane with 3-(3-alkyl-5-tert-butyl-4-hydroxyphenyl)propionic acid or its acid halide, acid anhydride or lower alkyl ester.

In the phenolic compound represented by the formula (I), $R_1$ is a methyl, ethyl or propyl group, but a methyl group is preferred in terms of the deterioration preventing effect.

The effect of the phenolic compound is developed by blending 0.01 to 1 part by weight, preferably 0.05 to 0.5 part by weight of the compound with 100 parts by weight of the resin composition comprising the polyolefin and inorganic filler. If the amount exceeds 1 part by weight, the effect corresponding to that amount cannot readily be obtained, which is disadvantageous economically and so not preferred.

The metal deactivator (B) used in the present invention is a compound having one or more

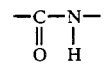

groups in the side chain. Preferably, it is a phenyl or phenol having one or more

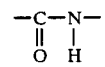

groups in the side chain. Specifically, there are given the following compounds:

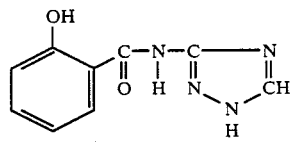
No. 1

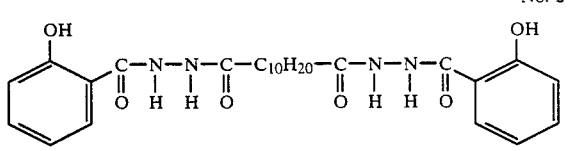
No. 2

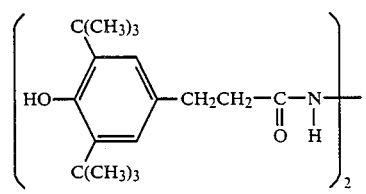
No. 3

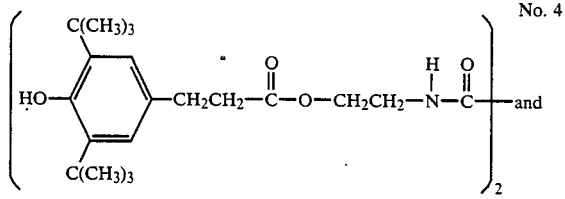

No. 4

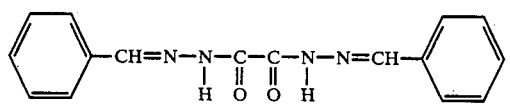

No. 5 among which the compounds No. 1 and No. 3 are particularly preferably used.

The effect of the metal deactivator is developed by blending 0.01 to 10 parts by weight, preferably 0.05 to 1 part by weight of the metal deactivator with 100 parts by weight of the resin composition comprising the polyolefin and inorganic filler. If the amount exceeds 10 parts by weight, the effect corresponding to that amount cannot readily be obtained, which is also economically disadvantageous.

The sulfur-containing compound (C) includes the compounds represented by the following formulae (II-1), (II-2), (II-3) and (II-4):

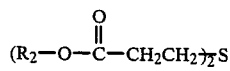  (II-1)

wherein $R_2$ represents a $C_4$–$C_{20}$ alkyl group,

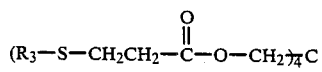  (II-2)

wherein $R_3$ represents a $C_4$–$C_{20}$ alkyl group,

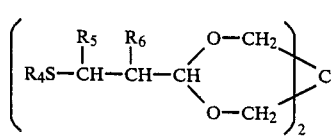  (II-3)

wherein $R_4$ represents a $C_3$–$C_{18}$ alkyl group, and $R_5$ and $R_6$ independently represent a hydrogen atom or a $C_1$–$C_6$ alkyl group, and

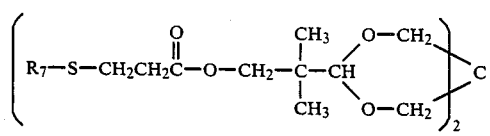  (II-4)

wherein $R_7$ represents a $C_3$–$C_{18}$ alkyl group.

With the compound represented by the formula (II-1), ones in which the substituent $R_2$ is a $C_{12}$–$C_{18}$ alkyl group, for example distearyl thiodipropionate, dimyristyl thiodipropionate, dilauryl thiodipropionate, etc. are preferably used.

In the compound represented by the formula (II-2), the substituent $R_3$ is preferably a $C_6$–$C_{18}$ alkyl group.

Representative examples of such compound will be shown in Table 1.

TABLE 1

$$(R_3-S-CH_2CH_2\overset{O}{\overset{\|}{C}}-O-CH_2)_4C$$

| Compound No. | $R_3$ |
|---|---|
| II-2-1 | $-C_6H_{13}$ |
| II-2-2 | $-C_{12}H_{25}$ |
| II-2-3 | $-C_{18}H_{37}$ |

In the compound represented by the formula (II-3), the substituent $R_4$ is preferably a $C_{12}$–$C_{18}$ alkyl group, and $R_5$ and $R_6$ are preferably a hydrogen atom or a $C_1$–$C_4$ alkyl group.

Representative examples of such compound will be shown in Table 2.

TABLE 2

$$\left(R_4-S-\overset{R_5}{\underset{|}{CH}}-\overset{R_6}{\underset{|}{CH}}-CH\overset{O-CH_2}{\underset{O-CH_3}{\diagup}}\right)_2 C$$

| Compound No. | $R_4$ | $R_5$ | $R_6$ |
|---|---|---|---|
| II-3-1 | $-C_8H_{17}$ | $-CH_3$ | $-H$ |
| II-3-2 | $-C_{12}H_{25}$ | $-C_4H_9$ | $-H$ |
| II-3-3 | $-C_{12}H_{25}$ | $-CH_3$ | $-H$ |
| II-3-4 | $-C_{18}H_{37}$ | $-CH_3$ | $-H$ |
| II-3-5 | $-C_{12}H_{25}$ | $-H$ | $-H$ |
| II-3-6 | $-C_{18}H_{37}$ | $-H$ | $-CH_3$ |

In the compound represented by the formula (II-4), the substituent $R_7$ is preferably a $C_{12}$–$C_{18}$ alkyl group. Representative examples of such compound will be shown in Table 3.

TABLE 3

$$\left(R_7-S-CH_2CH_2\overset{O}{\overset{\|}{C}}-O-CH_2-\overset{CH_3}{\underset{CH_3}{\overset{|}{\underset{|}{C}}}}-CH\overset{O-CH_2}{\underset{O-CH_2}{\diagup}}\right)_2 C$$

| Compound No. | $R_7$ |
|---|---|
| II-4-1 | $-C_{12}H_{25}$ |
| II-4-2 | $-C_{16}H_{33}$ |
| II-4-3 | $-C_{18}H_{37}$ |

The effect of the sulfur-containing compound is developed by blending 0.01 to 1 part by weight, preferably 0.05 to 0.5 part by weight of the compound with 100 parts by weight of the resin composition comprising the polyolefin and inorganic filler.

The composition of the present invention may be blended with other additives such as ultraviolet absorbers, light stabilizers, antioxidants, metal soaps, nucleating agents, lubricants, antistatic agents, flame retardants, pigments and plasticizers, so far as its characteristics are not damaged.

Among the antioxidants, a preferred compound is phosphite type compounds. By adding the phosphite type compound, the stability and coloration property of the composition are improved.

Preferred phosphite type compounds include distearyl pentaerythritol diphosphite, tris(2,4-di-tert-butylphenyl)phosphite, tetrakis(2,4-di-tert-butylphenyl)-4,4'- biphenylene diphosphonite, bis(2,4-di-tert-butylphenyl) pentaerythritol diphosphite, etc.

The phosphite type compound is blended with the resin composition comprising the polyolefin and inorganic filler in amounts of 0.01 to 1 part by weight, preferably 0.05 to 0.5 part by weight based on 100 parts by weight of the resin composition.

In addition, propylene/ethylene rubbers, styrene/butadiene rubbers, maleic anhydride-modified polyolefins, silane compound-modified polyolefins, etc. may be blended with the composition.

For blending the polyolefin with the phenolic compound, metal deactivator, sulfur-containing compound and other additives, any method suitable to obtain homogeneous compositions may be employed. These materials may be blended either at a time or stepwise, or converted to a master batch by mixing a part or all of them.

These materials are kneaded by the common kneading methods, i.e. methods using a roll, Banbury mixer, single-screw extruder, twin-screw extruder, etc.

The present invention will be illustrated specifically with reference to the following examples, but it is not limited to these examples.

EXAMPLES 1 TO 6

One hundred parts by weight of polypropylene(-homopolymer) powders (intrinsic viscosity [ξ], 2.20), 0.05 part by weight of calcium stearate, the phenolic compound, metal deactivator and sulfur-containing compound were mixed. The mixture was mixed on a Henschel mixer and extruded into pellets at a temperature of 230° C. on a 65 mm φ extruder in a nitrogen gas atmosphere. The pellets thus obtained were measured for melt index (MI) according to JIS K 7210.

These pellets were pre-heated for 10 minutes at a temperature of 230° C. and formed into a press sheet of 1 mm in thickness. The press sheet obtained was brought into contact with a copper plate and placed in a Geer oven kept at a temperature of 150° C. to measure the thermal stability.

Separately, the yellowness index (YI) of this press sheet was measured according to ASTM D 1925. The results are shown in Table 4.

Comparative examples 1 to 3

Test was carried out in the same manner as in Example 1 under conditions shown in Table 4 using the conventional pentaerythritol tetrakis[3-(3,5-di-tert-butyl-4-hydroxyphenyl)propionate](A-3) as the phenolic compound. The results are shown in Table 4.

EXAMPLES 7 TO 10

Procedure was carried out in the same manner as in Example 1 except that a propylene/ethylene block copolymer (ethylene content, 7.3 wt.%; [ξ]=2.45) was used as the polyolefin, and that 100 parts by weight of this block copolymer, 0.05 part by weight of calcium stearate, the phenolic compound, metal deactivator, sulfur-containing compound and phosphite type compound, bis(2,4-di-tert-butylphenyl) pentaerythritol diphosphite, were blended together. The results are shown in Table 4.

TABLE 4

| Number | Phenolic compound Kind | Phenolic compound Part by weight | Metal deactivator Kind | Metal deactivator Part by weight | Sulfur-containing compound Kind | Sulfur-containing compound Part by weight | Phosphite type compound Kind | Phosphite type compound Part by weight | MI (g/10 min) | Thermal stability (hour) | YI |
|---|---|---|---|---|---|---|---|---|---|---|---|
| Example 1 | A-1 | 0.1 | B-1 | 0.1 | C-1 | 0.3 | — | — | 2.8 | 1250 | −27 |
| Example 2 | A-1 | 0.2 | B-1 | 0.1 | C-1 | 0.3 | — | — | 2.7 | 1630 | −28 |
| Example 3 | A-1 | 0.1 | B-1 | 0.2 | C-1 | 0.3 | — | — | 2.7 | 1780 | −24 |
| Example 4 | A-1 | 0.15 | B-2 | 0.4 | C-1 | 0.3 | — | — | 2.7 | 2350 | −16 |
| Example 5 | A-2 | 0.1 | B-1 | 0.1 | C-1 | 0.3 | — | — | 2.8 | 1160 | −26 |
| Example 6 | A-1 | 0.15 | B-1 | 0.1 | C-2 | 0.3 | — | — | 2.7 | 1490 | −27 |
| Example 7 | A-1 | 0.15 | B-1 | 0.1 | C-1 | 0.3 | D-1 | 0.05 | 2.4 | 2470 | −24 |
| Example 8 | A-1 | 0.15 | B-2 | 0.4 | C-1 | 0.3 | D-1 | 0.05 | 2.4 | 2900 | −16 |
| Example 9 | A-1 | 0.15 | B-1 | 0.1 | C-2 | 0.3 | D-1 | 0.05 | 2.4 | 2250 | −24 |
| Example 10 | A-1 | 0.15 | B-2 | 0.4 | C-2 | 0.3 | D-1 | 0.05 | 2.4 | 2600 | −15 |
| Comparative example 1 | A-3 | 0.2 | B-1 | 0.1 | C-1 | 0.3 | — | — | 2.9 | 1160 | −25 |
| Comparative example 2 | A-3 | 0.1 | B-1 | 0.2 | C-1 | 0.3 | — | — | 3.0 | 1260 | −22 |
| Comparative example 3 | A-3 | 0.15 | B-2 | 0.4 | C-1 | 0.3 | — | — | 2.9 | 1800 | −12 |

Abbreviations in Table 4 represent the following compounds. Phenolic compound:

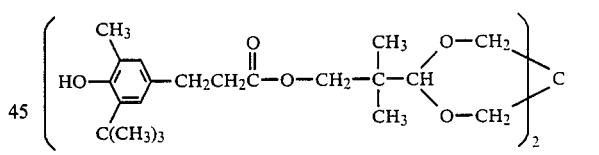

A-1

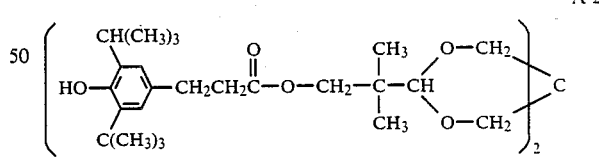

A-2

A-3 Pentaerythritol tetrakis[3-(3,5-di-tert-butyl-4-hydroxyphenyl)propionate]

Metal deactivator:

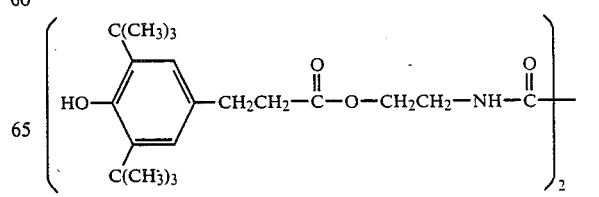

B-1

-continued

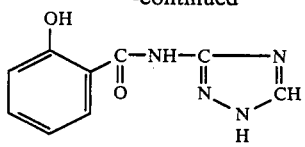

Sulfur-containing compound:
C-1 Dimyristyl thiodipropionate

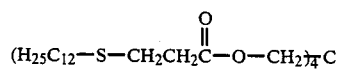

Phosphite type compound:
D-1 Bis(2,4-di-tert-butylphenyl) pentaerythritol diphosphite

EXAMPLES 11 TO 15

One hundred parts by weight of a resin composition comprising propylene/ethylene block copolymer powders (intrinsic viscosity [ξ], 2.45; ethylene content, 7.3 wt.%) and talc (Micron White 5000S; a product of Hayashi Kasei K.K.) which was an inorganic filler was mixed with 0.05 part by weight of calcium stearate, the phenolic compound, metal deactivator, sulfur-containing compound and 0.05 part by weight of bis(2,4-di-tert-butylphenyl) pentaerythritol diphosphite. The mixture obtained was mixed on a Henschel mixer, kneaded and pelletized on a 65 mm φ extruder. The pellets obtained were preheated at a temperature of 230° C. for 10 minutes and formed into a press sheet of 1 mm in thickness. The sheet obtained was brought into contact with a copper plate and placed in a Geer oven kept at a temperature of 150° C. to measure the thermal stability.

The melt index (MI) of the pellets was measured according to JIS K 7210. The yellowness index (YI) of the press sheet was measured according to ASTM D 1925. The results obtained and the proportions of the materials are shown together in Table 5.

Comparative examples 4 and 5

Test was carried out in the same manner as in Example 11 under conditions shown in Table 5 using pentaerythritol tetrakis[3-(3,5-di-tert-butyl-4-hydroxyphenyl)propionate](A-3) as the phenolic compound. The results are shown in Table 5.

F-1, F-2 and F-3, of inorganic filler represent the following substances:
F-1 talc
F-2 calcium carbonate
F-3 calcium silicate.

EXAMPLES 16 TO 18

Test was carried out in the same manner as in Example 11 under conditions shown in Table 5 using varying kinds of inorganic filler. The results are shown in Table 5 together with the results of other examples.

Comparative example 6

Test was carried out in the same manner as in Example 16 under a condition shown in Table 5 using A-3 as the phenolic compound. The result is shown in Table 5.

According to the present invention, there is provided a composition stabilized against heavy metals which comprises blending a polyolefin such as polypropylene containing or not containing an inorganic filler with the particular phenolic compound, metal deactivator and sulfur-containing compound. This composition exhibits a greatly improved thermal stability as compared with the conventional compositions particularly when brought into contact with copper plates at high temperatures. This composition has also an improved coloration property.

What is claimed is:

1. A polyolefin composition which comprises 100 parts by weight of a resin composition comprising 100 to 35 wt.% of a polyolefin and 0 to 65 wt.% of an inorganic filler in combination with the following components:

(A) 0.01 to 1 part by weight of a phenolic compound represented by the formula (I),

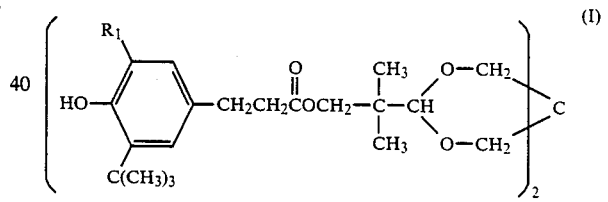

wherein $R_1$ represents a $C_1$–$C_3$ alkyl group,
(B) 0.01 to 10 parts by weight of a metal deactivator

TABLE 5

| Number | Inorganic filler Kind | Inorganic filler Part by weight | Phenolic compound Kind | Phenolic compound Part by weight | Metal deactivator Kind | Metal deactivator Part by weight | Sulfur-containing compound Kind | Sulfur-containing compound Part by weight | MI (g/10 min) | Thermal stability (hour) | YI |
|---|---|---|---|---|---|---|---|---|---|---|---|
| Example 11 | F-1 | 20 | A-1 | 0.15 | B-1 | 0.1 | C-1 | 0.3 | 2.6 | 800 | −4 |
| Example 12 | F-1 | 20 | A-1 | 0.15 | B-2 | 0.4 | C-1 | 0.3 | 2.6 | 2800 | 0 |
| Example 13 | F-1 | 40 | A-1 | 0.30 | B-2 | 0.4 | C-1 | 0.3 | 2.3 | 2000 | −2 |
| Example 14 | F-1 | 20 | A-2 | 0.30 | B-1 | 0.1 | C-1 | 0.3 | 2.6 | 1500 | −6 |
| Example 15 | F-1 | 20 | A-1 | 0.15 | B-2 | 0.4 | C-2 | 0.3 | 2.6 | 2650 | 0 |
| Example 16 | F-2 | 20 | A-1 | 0.15 | B-1 | 0.1 | C-1 | 0.3 | 2.3 | 820 | −5 |
| Example 17 | F-2 | 40 | A-1 | 0.15 | B-1 | 0.2 | C-1 | 0.3 | 2.3 | 1050 | −1 |
| Example 18 | F-3 | 20 | A-1 | 0.15 | B-1 | 0.1 | C-1 | 0.3 | 2.4 | 1200 | −2 |
| Comparative example 4 | F-1 | 20 | A-3 | 0.15 | B-1 | 0.1 | C-1 | 0.3 | 2.6 | 410 | −1 |
| Comparative example 5 | F-1 | 40 | A-3 | 0.30 | B-2 | 0.4 | C-1 | 0.3 | 2.3 | 1020 | 3 |
| Comparative example 6 | F-2 | 20 | A-3 | 0.15 | B-1 | 0.1 | C-1 | 0.3 | 2.3 | 420 | −1 |

Abbreviations A-1, A-2, A-3, B-1, B-2, C-1 and C-2 in Table 5 are the same as described above. Abbreviations, having one or more $$-\underset{\underset{O}{\|}}{C}-\underset{\underset{H}{|}}{N}-$$

groups in the side chain, and
(C) 0.01 to 1 part by weight of a sulfur-containing compound represented by the formula (II-1), (II-2), (II-3) or (II-4):

$$(R_2-O-\underset{\underset{O}{\|}}{C}-CH_2CH_2)_2S \quad (II-1)$$

wherein $R_2$ represents a $C_4$–$C_{20}$ alkyl group, $$(R_3-S-CH_2CH_2-\underset{\underset{O}{\|}}{C}-O-CH_2)_4C \quad (II-2)$$

wherein $R_3$ represents a $C_4$–$C_{20}$ alkyl group, $$\left( R_4S-\underset{\underset{|}{R_5}}{CH}-\underset{\underset{|}{R_6}}{CH}-CH\underset{O-CH_2}{\overset{O-CH_2}{\diagup}}\right)_2 C \quad (II-3)$$

wherein $R_4$ represents a $C_3$–$C_{18}$ alkyl group, and $R_5$ and $R_6$ independently represent a hydrogen atom or a $C_1$–$C_6$ alkyl group, $$\left( R_7-S-CH_2CH_2\underset{\underset{O}{\|}}{C}-O-CH_2-\underset{\underset{CH_3}{|}}{\overset{\overset{CH_3}{|}}{C}}-CH\underset{O-CH_2}{\overset{O-CH_2}{\diagup}}\right)_2 C \quad (II-4)$$

wherein $R_7$ represents a $C_3$–$C_{18}$ alkyl group.

2. A polyolefin composition as claimed in claim 1, wherein the resin composition comprises 95 to 60 wt.% of a polyolefin and 5 to 40 wt.% of an inorganic filler.

3. A polyolefin composition as claimed in claim 1, wherein $R_1$ in the formula (I) is a methyl, ethyl or propyl group.

4. A polyolefin composition as claimed in claim 1, wherein the metal deactivator (B) is a phenyl or phenol containing one or more $$-\underset{\underset{O}{\|}}{C}-\underset{\underset{H}{|}}{N}-$$

groups in the side chain.

5. A polyolefin composition as claimed in claim 4, wherein the metal deactivator (B) is

[structure with OH, C(=O)-N(H)-C=N-CH with N-H ring]

or

-continued

[structure with C(CH₃)₃, HO-phenyl, CH₂CH₂-C(=O)-O-CH₂CH₂-N(H)-C(=O)-]₂

6. A polyolefin composition as claimed in claim 1, wherein the sulfur-containing compound is one represented by the formula (II-1), and the substituent $R_2$ is a $C_{12}$–$C_{18}$ alkyl group.

7. A polyolefin composition as claimed in claim 1, wherein the sulfur-containing compound is one represented by the formula (II-2), and the substituent $R_3$ is a $C_6$–$C_{18}$ alkyl group.

8. A polyolefin composition as claimed in claim 1, wherein the sulfur-containing compound is one represented by the formula (II-3), the substituent $R_4$ is a $C_{12}$–$C_{18}$ alkyl group, and $R_5$ and $R_6$ are each a hydrogen atom or a $C_1$–$C_4$ alkyl group.

9. A polyolefin composition as claimed in claim 1, wherein the sulfur-containing compound is one represented by the formula (II-4), and the substituent $R_7$ is a $C_{12}$–$C_{18}$ alkyl group.

10. A polyolefin composition as claimed in claim 1, wherein the inorganic filler is at least one member selected from the group consisting of metal oxides, metal hydroxides, metal carbonates, metal sulfates, metal silicates, silicate minerals, carbides and ceramics.

11. A polyolefin composition as claimed in claim 1, wherein the inorganic filler has an average particle diameter not more than $20\mu$, preferably in the range of 0.05 to $5\mu$.

12. A polyolefin composition which comprises 100 parts by weight of a resin composition comprising 100 to 35 weight percent of a polyolefin and 0 to 65 weight percent of an inorganic filler in combination with the following components:
(a) 0.01 to 1 part by weight of a phenolic compound represented by the formula (I),

[structure with $R_1$, HO-phenyl, C(CH₃)₃, CH₂CH₂COCH₂-C(CH₃)₂-CH(O-CH₂)₂C]₂ wherein $R_1$ represents a $C_1$–$C_3$ alkyl group,
(b) 0.01 to 10 parts by weight of a metal deactivator represented by the formula (III-1), (III-2), (III-3) or (III-4)

[structure with OH-phenyl, C(=O)-N(H)-C=N-CH with N-H ring] (III-1)

-continued

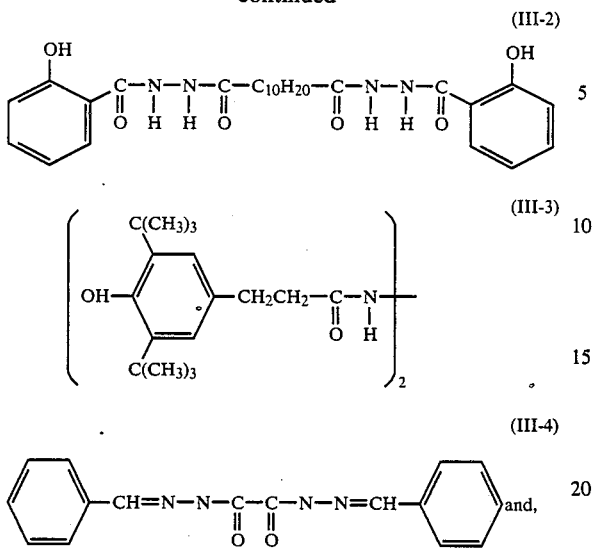

(c) 0.01 to 1 part by weight of a sulfur-containing compound represented by formula (II-1) or (II-2):

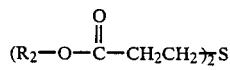   (II-1)

wherein $R_2$ represents a $C_4$–$C_{20}$ alkyl group,

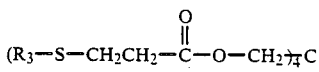   (II-2)

wherein $R_3$ represents a $C_4$–$C_{20}$ alkyl group.

13. A polyolefin composition as claimed in claim 12, wherein the resin composition comprises 95 to 60 weight percent of a polyolefin and 5 to 40 weight percent of an inorganic filler.

14. A polyolefin composition as claimed in claim 12, wherein $R_1$ in the phenolic compound represented by the formula (I) is a methyl, ethyl or propyl group.

15. A polyolefin composition as claimed in claim 12, wherein the sulfur-containing compound is one represented by the formula (II-2), and the substituent $R_3$ is a $C_6$–$C_{18}$ alkyl group.

16. A polyolefin composition as claimed in claim 12, wherein the inorganic filler is at least one member selected from the group consisting of metal oxides, metal hydroxides, metal carbonates, metal sulfates, metal silicates, silicate minerals, carbides and ceramics.

17. A polyolefin composition as claimed in claim 12, wherein the inorganic filler has an average particle diameter not more than $20\mu$, preferably in the range of 0.05 to $5\mu$.

18. A polyolefin composition as claimed in claim 12, wherein the sulfur-containing compound is one represented by the formula (II-1), and the substituent $R_2$ is a $C_{12}$–$C_{18}$ alkyl group.

* * * * *